United States Patent
Fields et al.

[15] 3,702,933
[45] Nov. 14, 1972

[54] DEVICE AND METHOD FOR DETERMINING X-RAY REFLECTION EFFICIENCY OF OPTICAL SURFACES

[72] Inventors: Stanley A. Fields, Decatur; John M. Reynolds, Huntsville, both of Ala.

[73] Assignee: The United States of America as represented by the Administrator of the National Aeronautics and Space Administration

[22] Filed: July 31, 1970

[21] Appl. No.: 59,894

[52] U.S. Cl. .................................. 250/51.5, 250/52
[51] Int. Cl. ............................................. G01n 23/20
[58] Field of Search ........................... 250/51.5, 52

[56] References Cited

UNITED STATES PATENTS 3,105,901  10/1963  Ladell ..................... 250/51.5
3,566,123  2/1971   Browning ................ 250/51.5

Primary Examiner—James W. Lawrence
Assistant Examiner—C. E. Church
Attorney—L. D. Wofford, Jr., W. H. Riggins and John R. Manning

[57] ABSTRACT

A device and method for testing the X-ray reflection efficiency and scattering properties of various optical surfaces comprising a crystal monochromator mounted to receive and diffract X-rays generated by an X-ray source. The X-rays are diffracted from the crystal so as to impinge on the optical surface being tested. The X-rays reflected by the optical surface are directed toward a detector capable of indicating the intensity of the X-rays reflected by the optical surface. Intensity readings are initially made of X-rays diffracted directly from the crystal to a detector and subsequently are made of the identical X-rays diffracted from the crystal to the optical surface and reflected to a detector. The crystal, optical surface test specimen and detectors are mounted for rotation to desired angle positions and the entire apparatus is enclosed in a vacuum chamber.

1 Claim, 1 Drawing Figure

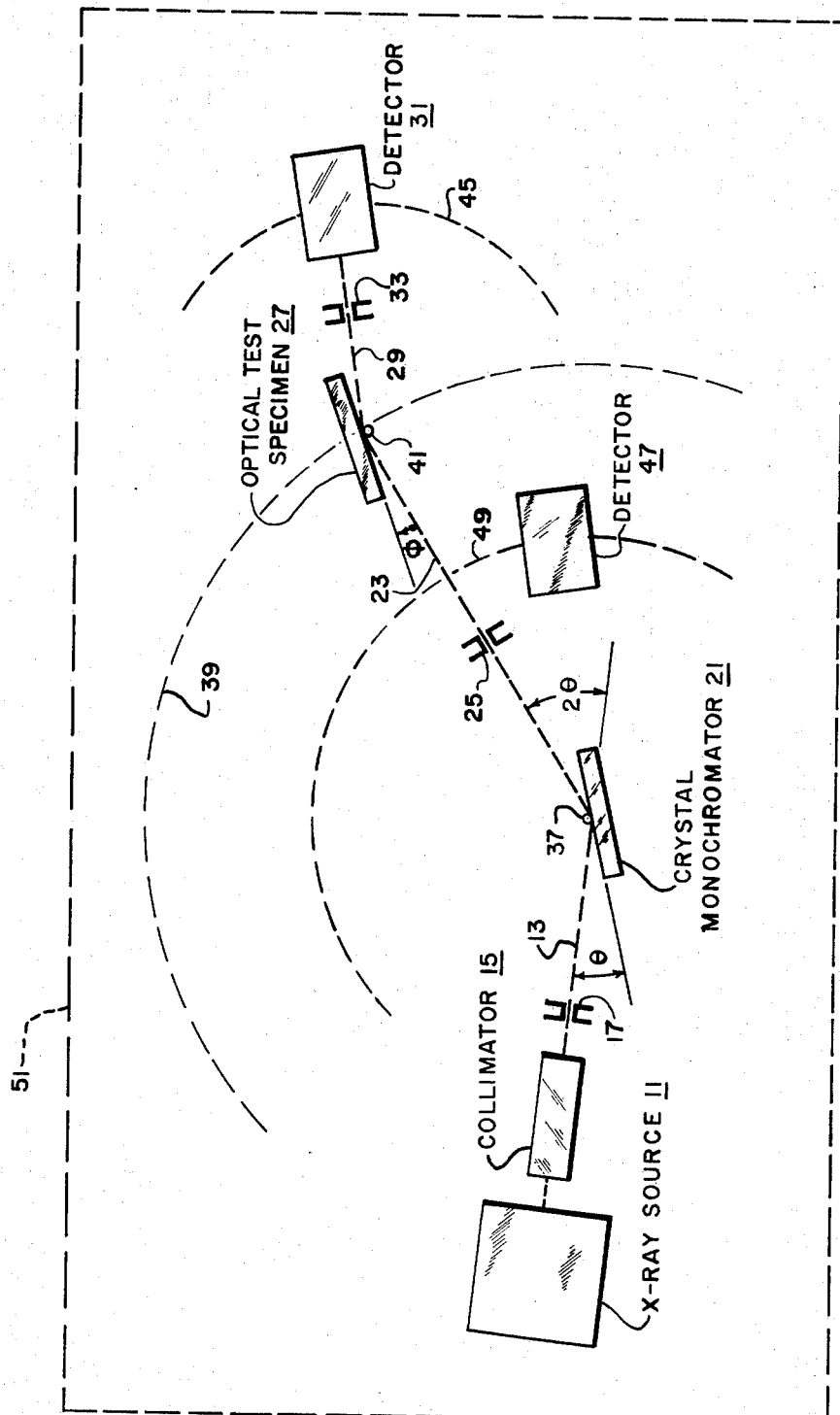

ical surfaces according to the invention.

DEVICE AND METHOD FOR DETERMINING X-RAY REFLECTION EFFICIENCY OF OPTICAL SURFACES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to X-ray apparatus and more particularly to a device and method for testing the X-ray reflection efficiency, scattering properties and surface finish of various materials to determine the suitability of such materials for use as X-ray reflectors in X-ray apparatus, e.g., X-ray telescopes.

A principal aspect of future space exploration involves the prolonged scientific study of the sun and other X-ray emitting stars and astronomical sources with the use of X-ray telescopes installed in earth orbiting laboratories. Although the sun is a relatively strong source of X-rays, other stellar sources to be studied are relatively weak. Therefore, extremely efficient X-ray telescopes will be required to obtain significant radiation data from these stellar sources. Materials having superior X-ray reflectance properties are needed for use as X-ray collectors in the telescopes to be used in future space laboratories. In addition, the materials must also have low scattering properties to obtain the necessary resolution of the telescopes. To air in identifying materials having the highest X-ray reflection efficiency a means is needed to conveniently, expeditiously and accurately test various materials to determine their reflectance capability.

SUMMARY OF THE INVENTION

The invention comprises an X-ray source and a crystal monochromator with the latter being mounted to receive and diffract X-rays generated by the X-ray source. An optical surface being tested for X-ray reflection efficiency is mounted to receive and reflect X-rays diffracted by the crystal. The intensity of the X-rays reflected by the specimen under test is measured by an X-ray detector arranged in proper relationship to the specimen. Prior to measuring the intensity of X-rays reflected by the test specimen the X-rays may be diffracted directly from the crystal to an X-ray detector to obtain intensity readings. This procedure gives a positive test of intensity loss resulting from reflection of the X-rays by the test specimen and, thereby, determines the reflection efficiency of the specimen. The crystal, test specimen and detectors are mounted for rotation to the desired angle positions.

Accordingly, it is a general object of the present invention to provide an improved device and method for determining the X-ray reflection efficiency of various materials.

A more specific object of the invention is to provide a means for conveniently and accurately identifying materials having superior X-ray reflection and low scatter characteristics to determine the suitability of such materials for use as X-ray reflectors in earth orbiting X-ray telescopes.

Another object of the invention is to provide a device and method for generating an X-ray beam of known characteristics and comparing the intensity of such X-ray beam prior to and subsequent to reflection of the beam by a specimen being tested for X-ray reflection efficiency.

These and other objects and advantages of the invention will become apparent upon reference to the following specification, attendant claims and drawing.

BRIEF DESCRIPTION OF THE DRAWING

The single FIGURE shows schematically a device for determining the X-ray reflection efficiency of optical surfaces according to the invention.

DESCRIPTION OF THE PREFERRED EMBODIMENT

Referring to the drawing FIGURE, an X-ray source 11 emits X-rays 13 which are collimated by a collimator 15 and limited in divergence by scattering slits 17. The X-rays 13 are diffracted by an analyzing crystal monochromator 21 and diffracted rays 23 pass through receiving slits 25 and subsequently impinge on an optical flat test specimen 27. X-rays 29 that are reflected by the test specimen 27 are sent to an X-ray detector 31 through a scattering slit 33. The output of the detector 31, such as a Geiger-Muller counter, proportional counter or scintillation counter, is preferably in the form of electrical pulses proportional to the intensity of the X-rays received by the detector.

To obtain X-rays having the wavelength desired for reflection from the test specimen 27, the X-ray source 11 contains an anode that may be changed to allow the insertion of a material that will emit the desired wavelength radiation. The crystal monochromator 21 is rotated around a shaft 37 to the proper angle $\theta$ to diffract the desired wavelength emitted by the source 11. The angle $\theta$ is determined using the Bragg formula, $$n \lambda = 2d \sin \theta$$

where $n$ is the order of reflection, $\lambda$ is the wavelength of the radiation, $d$ is the interplanar spacing between the crystal planes and $\theta$ is the angle of incidence on the crystal planes.

The optical flat test specimen 27 is mounted for rotation along a circular arc 39 of a goniometer assembly. The specimen 27 is maintained at an angular position of $2\theta$ to intersect the diffracted X-rays 23. The crystal 21 is linked with the specimen 27 and the receiving slits 25 so that each of these components may be rotated around the shaft 37.

The optical test specimen 27 is rotatable around a shaft 41 for adjustment to an angle of incidence $\phi$. The angle $\phi$ is very finely set since it is desired to determine the reflection efficiency and scatter characteristics of the specimen at a precise angle of incidence. The detector 31 is mounted for rotation along a circular arc 45 of a goniometer assembly. The detector 31, slits 33, and test specimen 27 is rotatable about the shaft 41.

A second detector 47, which is similar to the detector 31, is mounted for rotation along a circular arc 49 centered around the shaft 37. For a purpose to be explained subsequently the detector 47 may be rotated to the $2\theta$ angle between the crystal 21 and the test specimen 27 to receive X-rays 23 directly from the crystal 21.

In order to minimize atmospheric absorption of X-rays, particularly of longer wavelength X-rays, the apparatus, with the exception of certain controls and meters (not shown), is contained in a vacuum enclosure indicated schematically at 51.

OPERATION

To determine the X-ray reflection efficiency scattering characteristics of a particular material, an optical flat specimen 27 of the material is mounted on the circular arc 39. The X-ray source 11 is provided with an anode that will emit X-rays having the wavelength desired for the reflectance test. The crystal monochromator 21 is positioned at the angle $\theta$ such that the crystal will diffract X-rays of the desired wavelength toward the optical test specimen 27. The specimen 27 is rotated around the shaft 41 to precisely set the incidence angle $\phi$ determined for the reflectance test.

Before the X-rays 23 diffracted by the crystal 21 are impinged on the test specimen 27 they are first diffracted directly from the crystal 21 to the detector 47 to obtain the intensity of the diffracted X-rays. This is done by rotating the detector 47 to the $2\theta$ position along the arc 49 in alignment with the diffracted X-rays 23. When the intensity of the X-rays diffracted directly from the crystal 21 to the detector 47 has been established the detector 47 is then rotated out of the line of diffraction between the crystal 21 and the test specimen 27. The X-rays 23 from the crystal 21 are then reflected from the test specimen 27 to the detector 31. The detector 31 is rotated along the arc 45 to measure the intensity of the reflected X-rays 29 at the angular position $\phi$ and to determine the X-ray scattering properties of the test specimen. A comparison of the X-ray intensity indicated by the detectors 47 and 31 gives an exact measurement of the intensity loss resulting from reflection of the X-rays by the test specimen 27.

What is claimed is:

1. A method for determining the X-ray reflection efficiency and scatter characteristics of optical surfaces comprising:
   a. generating X-rays having a known wavelength;
   b. diffracting said X-rays and measuring the intensity of said diffracted X-rays:
   c. subsequently diffracting said X-rays toward an optical surface test specimen for reflection by said specimen;
   d. measuring the intensity of said X-rays reflected by said specimen;
   e. comparing the intensity of said X-rays prior to and subsequent to reflection from said specimen.

* * * * *